United States Patent
Jin et al.

(10) Patent No.: US 11,186,734 B2
(45) Date of Patent: Nov. 30, 2021

(54) EPOXY RESIN EMULSIONS FOR ELECTROCOATING

(71) Applicant: AXALTA COATING SYSTEMS IP CO., LLC, Wilmington, DE (US)

(72) Inventors: Xin Jin, Berwyn, PA (US); Chun Ren, Philadelphia, PA (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 0 days.

(21) Appl. No.: 16/427,869

(22) Filed: May 31, 2019

(65) Prior Publication Data

US 2020/0377740 A1    Dec. 3, 2020

(51) Int. Cl.

| C09D 5/44 | (2006.01) |
|---|---|
| C08G 59/06 | (2006.01) |
| C08G 59/50 | (2006.01) |
| C09D 5/02 | (2006.01) |
| C09D 163/10 | (2006.01) |
| C08K 5/09 | (2006.01) |
| C08K 5/13 | (2006.01) |

(52) U.S. Cl.
CPC ............. *C09D 5/443* (2013.01); *C08G 59/06* (2013.01); *C08G 59/504* (2013.01); *C09D 5/027* (2013.01); *C09D 5/4438* (2013.01); *C09D 163/10* (2013.01); *C08K 5/09* (2013.01); *C08K 5/13* (2013.01)

(58) Field of Classification Search
CPC ............ C09D 163/00–10; C09D 5/443; C09D 5/4434; C09D 5/4438; C08L 63/00–10; C08G 59/1477

See application file for complete search history.

(56) References Cited

U.S. PATENT DOCUMENTS

| 2,881,219 A * | 4/1959 | Thompson ............... C07C 39/14 |
|---|---|---|
| | | 568/628 |
| 5,194,560 A | 3/1993 | Laugal et al. |
| 5,591,788 A * | 1/1997 | Anderson ............ C08G 59/066 |
| | | 204/489 |
| 6,245,835 B1 | 6/2001 | Klein et al. |
| 6,274,649 B1 | 8/2001 | Ott et al. |
| 2009/0326173 A1 | 12/2009 | Tazzia et al. |
| 2012/0222962 A1* | 9/2012 | Nishiguchi ........ C08G 18/8064 |
| | | 205/235 |
| 2014/0332330 A1* | 11/2014 | Orr ....................... F16D 65/127 |
| | | 188/218 XL |

FOREIGN PATENT DOCUMENTS

EP    0491550 A2    6/1992

OTHER PUBLICATIONS

EPO, European Extended Search Report issued in EP App. No. 20177365.2, dated Sep. 8, 2020.

* cited by examiner

Primary Examiner — Kregg T Brooks
(74) Attorney, Agent, or Firm — Lorenz & Kopf LLP

(57) ABSTRACT

An epoxy resin emulsion includes a continuous phase including an aqueous carrier and an acid. The emulsion also includes a dispersed phase including an epoxy resin. The epoxy resin is the reaction product of an amine compound and a first epoxy reactant. The first epoxy reactant itself includes the reaction product of (1) an aromatic diol monomer, (2) a di-glycidyl ether of Bisphenol A and/or a di-glycidyl ether of catechol, and (3) a C8-C18 alkyl phenolic end-capping agent. The (1) aromatic diol monomer has the structure:

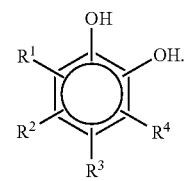

In this structure, each of $R^1$-$R^4$ is independently a hydrogen atom, a $C_1$-$C_8$ alkyl group, a $C_3$-$C_8$ cycloalkyl group, an aryl group, an aralkyl group, a halide group, a cyano group, a nitro group, a blocked isocyanate group, or a $C_1$-$C_8$ alkyloxy group or wherein any two or more of $R^1$-$R^4$ may be a fused ring.

20 Claims, No Drawings

EPOXY RESIN EMULSIONS FOR ELECTROCOATING

TECHNICAL FIELD

The present disclosure generally relates to an epoxy resin emulsion that includes an aqueous continuous phase and that is free of sulfamic acid. More specifically, this disclosure relates to an emulsion including an epoxy resin that is the reaction product of an amine compound and a first epoxy reactant, wherein the first epoxy reactant includes the reaction product of an aromatic diol monomer, a di-glycidyl ether of Bisphenol A and/or a di-glycidyl ether of catechol, and a C8-C18 alkyl phenolic end-capping agent.

BACKGROUND

Electrodeposition (Ecoat) is a well-known industrial process. Electrodeposition of primers to galvanized steel substrates is widely used in the automotive industry. Premium Ecoat products are supposed to provide excellent edge corrosion protection and acceptable coating appearance. However, many methods to improve edge protection or edge coverage deteriorate coating appearance. It is a significant technical challenge to meet the edge protection and coating appearance requirements for various manufacturers.

In electrodeposition coating processes, a conductive article, such as an autobody or an auto part, is immersed in a bath of an aqueous emulsion of film forming polymer and acts as an electrode in the electrodeposition process. An electric current is passed between the article and a counter-electrode in electrical contact with the aqueous emulsion, until a desired coating is deposited on the article. In a cathodic electrocoating process, which is popular in the automotive coating industry, the article to be coated is the cathode and the counter-electrode is the anode.

Bisphenol A based epoxy resins are widely used in the aqueous emulsion containing film forming polymers. In recent years, a great deal of research and development efforts have been made on the aqueous epoxy emulsion products for the Ecoat processing. However, those efforts could not deliver all coating performances demanded by the current customers. One of the main technical challenge is the balance between excellent edge corrosion protection and acceptable coating appearance.

Accordingly, there remains an opportunity for developing aqueous emulsion for use in Ecoat applications that provide an improved combination of edge corrosion protection and coating appearance. Furthermore, other desirable features and characteristics of the present disclosure will become apparent from the subsequent detailed description of the disclosure and the appended claims, taken in conjunction with the background of the disclosure.

BRIEF SUMMARY

This disclosure provides an epoxy resin emulsion. The emulsion includes a continuous phase including an aqueous carrier and an acid. The emulsion also includes a dispersed phase including an epoxy resin. The epoxy resin is the reaction product of an amine compound and a first epoxy reactant. The first epoxy reactant itself includes the reaction product of (1) an aromatic diol monomer, (2) a di-glycidyl ether of Bisphenol A and/or a di-glycidyl ether of catechol, and (3) a C8-C18 alkyl phenolic end-capping agent. The (1) aromatic diol monomer has the structure:

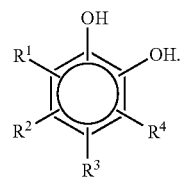

In this structure, each of $R^1$-$R^4$ is independently a hydrogen atom, a $C_1$-$C_8$ alkyl group, a $C_3$-$C_8$ cycloalkyl group, an aryl group, an aralkyl group, a halide group, a cyano group, a nitro group, a blocked isocyanate group, or a $C_1$-$C_8$ alkyloxy group or wherein any two or more of $R^1$-$R^4$ may be a fused ring.

This disclosure also provides an epoxy resin emulsion that is free of sulfamic acid and consists essentially of a continuous phase comprising water and formic acid and a dispersed phase comprising an epoxy resin that has a weight average molecular weight of from about 5,000 to about 10,000 g/mol and is the reaction product of aminopropyldiethanolamine, diethanolamine, and a first epoxy reactant, wherein the first epoxy reactant comprises the reaction product of catechol, a di-glycidyl ether of Bisphenol A, and 4-docecylphenol as an end-capping agent, wherein the epoxy resin cures to form a coating that has a surface roughness Ra of less than 0.4 μm as measured using ISO 4287 (R) on pretreated electrogalvanized substrates and that has an edge protection of less than 3 as measured using VDA 233-102 at 6 cycles on perforated electrogalvanized substrates.

DETAILED DESCRIPTION

The following detailed description is merely exemplary in nature and is not intended to limit the epoxy resin emulsions that are contemplated herein. Furthermore, there is no intention to be bound by any theory presented in the preceding background or the following detailed description.

Embodiments of the present disclosure are generally directed to epoxy resin emulsions and methods for forming the same. For the sake of brevity, conventional techniques related to epoxy resin emulsions may not be described in detail herein. Moreover, the various tasks and process steps described herein may be incorporated into a more comprehensive procedure or process having additional steps or functionality not described in detail herein. In particular, various steps in the manufacture of emulsions are well-known and so, in the interest of brevity, many conventional steps will only be mentioned briefly herein or will be omitted entirely without providing the well-known process details.

This disclosure provides an epoxy resin emulsion, hereinafter alternatively described as the "emulsion", that is free of sulfamic acid. The emulsion includes a continuous phase including an aqueous carrier and an acid. The emulsion also includes a dispersed phase including an epoxy resin. The epoxy resin is the reaction product of an amine compound and a first epoxy reactant. The first epoxy reactant itself includes the reaction product of (1) an aromatic diol monomer, (2) a di-glycidyl ether of Bisphenol A and/or a di-glycidyl ether of catechol, and (3) a C8-C18 alkyl phenolic end-capping agent. The (1) aromatic diol monomer has the structure:

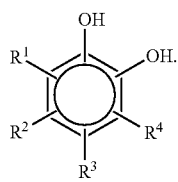

In this structure, each of $R^1$-$R^4$ is independently a hydrogen atom, a $C_1$-$C_8$ alkyl group, a $C_3$-$C_8$ cycloalkyl group, an aryl group, an aralkyl group, a halide group, a cyano group, a nitro group, a blocked isocyanate group, or a $C_1$-$C_8$ alkyloxy group or wherein any two or more of $R^1$-$R^4$ may be a fused ring.

Emulsion

The emulsion includes a continuous phase and a dispersed phase. The emulsion is not particularly limited and may be further described as an oil-in-water (O/W) emulsion or as a water-in-oil (W/O) emulsion, as conventionally understood. The emulsion is determined to exist based on visual inspection by one of skill in the art.

The continuous phase is aqueous and includes, is, consists essentially of, or consists of, an aqueous carrier and an acid. For example, the continuous phase may consist essentially of the aqueous carrier and the acid and be free of, or include less than 5, 4, 3, 2, 1, 0.5, 0.1, 0.05, or 0.01, weight percent of other additives, polymers, surfactants, etc. The aqueous carrier may be or include water such as DI water. In various embodiments, the aqueous carrier includes water and/or a polar solvent such as an alcohol, or other polar solvent. Alternatively, the carrier may be described as a polar carrier. In various non-limiting embodiments, all values and ranges of values, both whole and fractional, including and between the aforementioned values are hereby expressly contemplated for use herein.

The emulsion is free of sulfamic acid. In other embodiments, the emulsion is also free of lactic acid and/or acetic acid. In various embodiments, the terminology "free of" describes an amount of" the acid of less than 5, 4, 3, 2, 1, 0.5, 0.1, 0.05, or 0.01, weight percent based on a total weight of the emulsion. Alternatively, the emulsion may be entirely free of the acid (i.e., and include zero weight percent). In various non-limiting embodiments, all values and ranges of values, both whole and fractional, including and between the aforementioned values are hereby expressly contemplated for use herein.

Referring now to the acid, the acid is not particularly limited and may be any conventional acid. For example, the acid may be an organic acid and/or a mineral acid. For example, the acid may be further defined as an organic or inorganic acid, such as lactic acid, acetic acid, formic acid, and the like, to fully or partially neutralize the epoxy resin. The acid may be utilized in any amount chosen by one of skill in the art. In various embodiments, the acid is utilized in an amount such that a molar ratio between a neutralizing acid and amine content in the emulsion, as understood by one of skill in the art, is from about 20 to about 80, about 25 to about 75, about 30 to about 70, about 35 to about 65, about 40 to about 60, about 45 to about 55, about 45 to about 50, or about 30 to about 60, %. In various non-limiting embodiments, all values and ranges of values, both whole and fractional, including and between the aforementioned values are hereby expressly contemplated for use herein.

Referring now to the dispersed phase, the dispersed phase includes, is, consists essentially of, or consists of, an epoxy resin. In various embodiments, the dispersed phase consists essentially of the epoxy resin and is free of, or include less than 5, 4, 3, 2, 1, 0.5, 0.1, 0.05, or 0.01, weight percent of other additives, polymers, surfactants, etc. In various embodiments, the dispersed phase is in the form of discrete, identifiable particles. The emulsion is not particularly limited relative to particle size of the dispersed phase and may be a microemulsion or a nanoemulsion. Typically, the "particles" of the emulsion are particles of an epoxy resin, first introduced above. For example, such particles are not particularly limited in size or shape. Typically, the particles are approximately spherical or oval shaped, as understood by those of skill in the art. The particles may have an average mean diameter (or a distribution of average diameters) of from about 10 to about 200, about 20 to about 190, about 30 to about 180, about 40 to about 170, about 50 to about 160, about 60 to about 150, about 70 to about 140, about 80 to about 130, about 90 to about 120, about 100 to about 110, about 40 to about 105, about 45 to about 100, about 50 to about 95, about 55 to about 90, about 60 to about 85, about 65 to about 80, or about 70 to about 75, nanometers. The average diameter of the particles may be determined using any known particle size instrument such as a Malvern Mastersizer S or, in some cases, using optical microscopy and/or scanning electron microscopy. The aforementioned particle sizes can alternatively be obtained using a Microtrac Nanotrac Ultra particle size detector and are typically reported as MN, number average particle size. In various non-limiting embodiments, all values and ranges of values, both whole and fractional, including and between the aforementioned values are hereby expressly contemplated for use herein.

The epoxy resin itself is the reaction product of an amine compound and a first epoxy reactant, each described below. The epoxy resin is not particularly limited and may be any formed from the reaction of the amine compound and the first epoxy reactant. The epoxy resin typically has a weight average molecular weight of from about 1,000 to about 100,000, about 5,000 to about 95,000, about 10,000 to about 85,000, about 15,000 to about 80,000, about 20,000 to about 75,000, about 25,000 to about 70,000, about 30,000 to about 65,000, about 35,000 to about 60,000, about 40,000 to about 55,000, about 45,000 to about 50,000, about 1,000 to about 10,000, about 2,000 to about 9,000, about 3,000 to about 8,000, about 4,000 to about 7,000, about 5,000 to about 6,000, about 2,500 to about 10,000, about 5,000 to about 10,000, about 7,500 to about 10,000, about 1,000 to about 15,000, about 5,000 to about 15,000, about 10,000 to about 15,000, about 7,500 to about 15,000, or about 5,000 to about 7,500, g/mol. In various non-limiting embodiments, all values and ranges of values, both whole and fractional, including and between the aforementioned values are hereby expressly contemplated for use herein.

In various embodiments, the epoxy resin can have a core, such as follows, that repeats, wherein x is a value greater than 1:

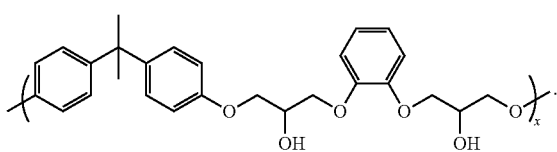

In other embodiments, the epoxy resin can have a terminal end, such as follows (as attached to the aforementioned core), formed from reaction with the amine compound:

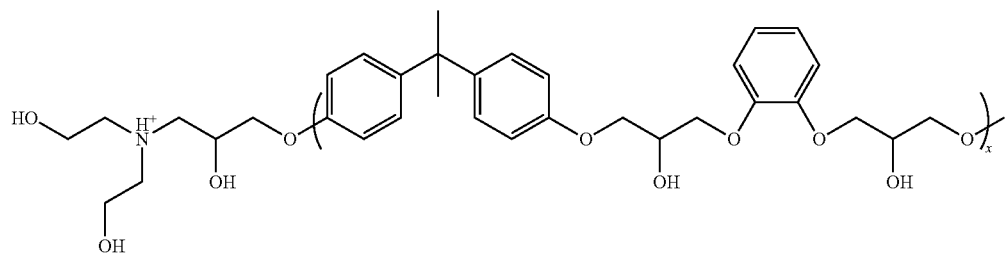

In still other embodiments, the epoxy resin can have a terminal end, such as follows, formed from reaction with an end-capping agent, described in greater detail below:

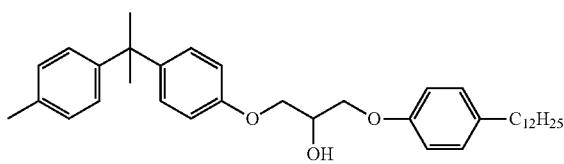

In further embodiments, the epoxy resin can have a chain extended middle portion, such as follows, formed from reaction with the amine compound:

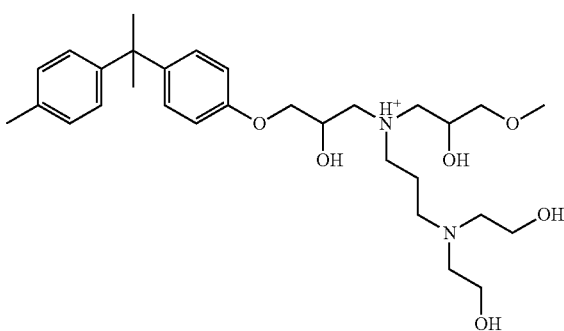

Referring now to the amine compound, the amine compound can be further defined as a chain-extender, a chain-terminator, or combinations thereof. For example, the amine compound may be a chain terminator such as diethanolamine or a chain extender such as aminopropyldiethanolamine, either independently or as a mixture. In various embodiments, the amine compound is further defined as a secondary hydroxylamine, which may be a chain terminator. Alternatively, the amine compound may be described as a primary hydroxylamine, which may be a chain extender. Any primary or secondary hydroxylamine known in the art may be utilized herein. In various embodiments, a blend of a chain terminator and chain extender may be utilized. In other embodiments, the amine compound is utilized in an amount such that the epoxy resin has a desired weight average molecular weight, e.g. such as about 1,000 to about 13,000, about 2,000 to about 11,000, or about 4,000 to about 10,000, g/mol. In various non-limiting embodiments, all values and ranges of values, both whole and fractional, including and between the aforementioned values are hereby expressly contemplated for use herein.

The first epoxy reactant is also not particularly limited and may be any known in the art. The first epoxy reactant typically can have one or more than one, e.g. two, epoxy moieties available for reaction in the molecule. In one embodiment, the first epoxy reactant has a single epoxy moiety available for reaction, e.g. as shown below.

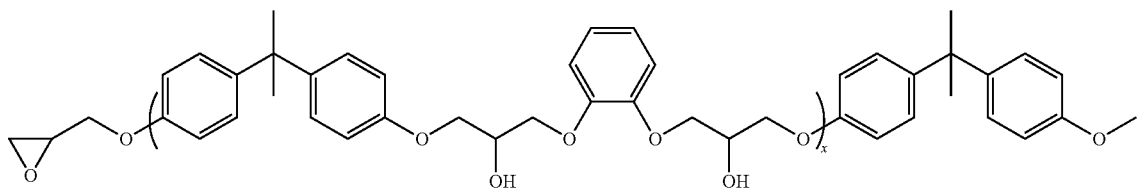

Electrocoating Composition

This disclosure also provides an electrocoating composition for coating a substrate. The electrocoating composition may be utilized to coat any type of substrate known in the art. In embodiments, the substrate is a vehicle, automobile, or automobile vehicle. "Vehicle" or "automobile" or "automobile vehicle" includes an automobile, such as, car, van, minivan, bus, SUV (sports utility vehicle); truck; semi-truck; tractor; motorcycle; trailer; ATV (all-terrain vehicle); pickup truck; heavy duty mover, such as, bulldozer, mobile crane and earth mover; airplanes; boats; ships; and other modes of transport. The electrocoating composition is utilized to form a coating layer on the substrate.

The electrocoating composition may include the emulsion of this disclosure. In addition to the emulsion, the electrocoating composition may include a crosslinking agent which has been neutralized with an acid to form a water-soluble product. Crosslinking agents for the electrocoating composition are also well known in the art. The crosslinking agent may be aliphatic, cycloaliphatic and aromatic isocyanates including any of the aforementioned isocyanates, such as hexamethylene diisocyanate, cyclohexamethylene diisocyanate, toluene diisocyanate, methylene diphenyl diisocyanate, and the like. These isocyanates may be pre-reacted with a blocking agent such as oximes, alcohols, or caprolactams which selectively block the isocyanate functionality. The isocyanates may be unblocked by heating to separate the blocking agent from the isocyanate group of the isocyanate thereby providing a reactive isocyanate group. Isocyanates and blocking agents are conventionally known.

The emulsion may include a cathodic binder which, along with a blocked isocyanate, can be the principal resinous ingredients in the electrocoating composition and may be present in amounts of from about 10 to about 70 wt. %, alternatively from about 20 to about 60 wt. %, or alternatively from about 30 to about 50 wt. %, based on a total solids of the electrocoating composition. An electrocoating bath may be formed by reducing the solids with an aqueous medium.

The electrocoating composition can further include a pigment which may be incorporated into the composition in the form of a pigment paste. The pigment paste may be prepared by grinding or dispersing a pigment into a pigment grinding vehicle and optional additives such as wetting agents, surfactants, and defoamers. The pigment grinding vehicle may be an anti-crater agent, a conventional pigment grinding vehicle that are well known in the art, or a combination thereof. The pigment may be grinded to a particle size of from about 6 to about 8 according to a Hegman grinding gauge. The pigment may include titanium dioxide, carbon black, barium sulfate, clay, and the like. In embodiments, pigments having high surface areas and oil absorbencies are utilized in a limited amount due to undesirable effects on coalescence and flow of the coating layer. A pigment to binder weight ratio may be about 2:1 to about 6:1 or about 3:1 to about 4:1. In embodiments, higher pigment to binder weight ratios may adversely affect coalescence and flow.

The electrocoating composition may further include additives such as wetting agents, surfactants, defoamers, and the like. Examples of surfactants and additional wetting agents include acetylenic alcohols available from Air Products and Chemicals as "Surfynol 104". These additives, when present, may be present in an amount of from about 0.1 to about 20 wt. % based on total binder solids of the electrocoating composition.

The electrocoating composition may further include a plasticizer to promote flow. Examples of suitable plasticizers may be high boiling water immiscible materials such as ethylene or propylene oxide adducts of nonyl phenols or bisphenol A. The electrocoating composition may include the plasticizer in an amount of from about 0.1 to about 15 wt. % based on total resin solids of the electrocoating composition. Binder solids include not only the resins but also additives whereas resin solids do not. However, due to small quantity of additives in the formulation, the actual difference is typically very small.

The electrocoating composition may be an aqueous dispersion. The terminology "dispersion" as utilized herein refers to a two-phase translucent or opaque aqueous resinous binder system in which the binder is in the dispersed phase and water the continuous phase. The average particle size diameter of the binder phase is in an amount of from about 0.01 to about 1 microns, alternatively about 0.05 to about 0.15 microns, alternatively less than 1 micron, or alternatively less than 0.15 microns. In embodiments, while the concentration of the binder in the aqueous medium is not generally critical, the major portion of the aqueous dispersion is typically water. The aqueous dispersion may include the binder in an amount of from about 3 to about 50 solids wt. % or alternatively about 5 to about 40 solids wt. %, based on total weight of the aqueous dispersion. In embodiments, aqueous binder concentrates which are to be further diluted with water when added to an electrocoating bath may have a range of binder solids of about 10 to about 30 wt. %.

EXAMPLES

Examples are provided below for the formation of various constituents in an electrocoating bath and for the electrocoating bath composition.

Example 1: Preparation of a Crosslinking Resin Solution

In this example, a crosslinking resin solution is prepared. 317.14 parts of Mondur® MR (methylene diphenyl diisocyanate), 47.98 parts of methyl isobutyl ketone and 0.064 parts of dibutyl tin dilaurate were charged into a suitable reaction vessel and heated to 37° C. under a nitrogen blanket. A mixture of 323.10 parts of diethylene glycol monobutyl ether and 13.04 parts of trimethylolpropane was slowly charged into the reaction vessel while maintaining the reaction mixture below 93° C. The reaction mixture was then held at 110° C. until essentially all of the isocyanate was reacted as indicated by infrared scan of the reaction mixture. 2.30 parts of butanol and 167.37 parts of methyl isobutyl ketone were then added. The resulting resin solution had a nonvolatile content of 75%.

Example 2: Preparation of an Epoxy Resin Emulsion

In this example, a (chain extended) epoxy resin emulsion is prepared. The following ingredients were charged into a suitable reaction vessel: Epon® 828 (epoxy resin of diglycidyl ether of bisphenol A having an epoxy equivalent weight of 188), catechol or bisphenol A, optionally para-dodecylphenol, optionally Pluoriol® P900 (polypropylene glycol with an average molecular weight of 900) and catalyst ethyltriphenyl phosphonium iodide. The resulting reaction mixture was heated to 160° C. under nitrogen blanket and held at room temperature for 1 hour. Crosslinking resin solution (from Example 1 above) was added and the reaction temperature cooled to 107° C. N,N-diethanolamine was then added to the reaction, followed by either oligoamines or aminoalcohols. The temperature of the resulting mixture rose and was held at 120° C. for 1 hour and then dispersed in an aqueous medium of deionized water, 56% lactic acid and 70% methanesulfonic acid (MSA) and nitric acid. The emulsion was kept agitated until the methyl isobutyl ketone was evaporated.

Three emulsions were prepared following the procedure in Example 2 and the compositions in the epoxy emulsions are shown in Table 1 below. The emulsion characterization results are listed in Table 2, also below.

TABLE 1

|  | Emulsion 1 | Comparative Emulsion 1 | Comparative Emulsion 2 |
|---|---|---|---|
|  | Weight Percentage | | |
| Epoxy Resin (EPON 828) | 15.1% | 14.0% | 15.8% |
| Catechol | 2.7% | — | 3.2% |
| Bisphenol A | — | 5.1% | — |
| Dodecylphenol | 0.8% | 0.8% | — |
| Pluriol ® P 900 | 3.7% | 3.4% | 3.9% |
| Ethyltriphenyl phosphonium iodide | <0.02% | <0.02% | <0.02% |
| Crosslinking Resin (from Example 1) | 18.3% | 17.1% | 19.1% |
| N,N-diethanolamine | 1.7% | 1.6% | 1.3% |
| Aminopropyldiethanolamine | 1.0% | 1.0% | 1.2% |
| Plasticizer additive | 0.8% | 0.8% | 0.8% |
| DI water | 53.5% | 53.9% | 52.3% |
| 56% lactic acid | 1.2% | 1.1% | 1.3% |
| 70% MSA | 0.7% | 0.6% | 0.7% |
| 5% nitric acid solution | 0.5% | 0.4% | 0.5% |
| Total | 100.0% | 100.0% | 100.0% |

TABLE 2

|  | Emulsion 1 | Comparative Emulsion 1 | Comparative Emulsion 2 |
|---|---|---|---|
| Solid content (%) | 41.13% | 35.40% | 40.01% |
| Particle size (MN, nm) | 105 | 39 | 98 |
| Viscosity (cP, #63, 100 rpm) | 105 | 32 | 117 |
| pH | 5.98 | 5.92 | 5.69 |
| Weight average MW | 7566 | 8839 | 13340 |

The solid contents were obtained from a Computrac MAX 4000XL moisture analyzer. The particle sizes were obtained from a Microtrac Nanotrac Ultra equipment. The number average particle size results (MN) are reported. The emulsion viscosity was measured from a Brookfield DV2T viscometer with a #63 spindle and 100 rpm rotation speed. The pH was measured by a Mettler Toledo pH meter. The weight average molecular weight (MW) was obtained from a 1260 Infinity GPC by Agilent Technologies.

Example 3: Preparation of an Acrylic Polymer Based Flow Control Additive

An acrylic polymer based flow additive can be used to achieve a good balance between crater resistance, ecoat appearance and top coat adhesion. In this example, 42.0 parts of methyl isobutyl ketone was charged in a suitable reaction vessel and heated to reflux under dry nitrogen blanket. 34.4 parts of 2-diethylaminoethyl methacrylate, 42.0 parts of hydroxypropyl acrylate, and 114.6 parts of butyl acrylate were charged and thoroughly mixed in monomer feed tank at room temperature. In initiator feed tank, 4.82 parts of 2,2'-azobis(2-methylbutyronitrile) were dissolved in 40.2 parts of methyl isobutyl ketone at room temperature. Contents in the monomer tank and initiator tank were feed to the reaction vessel simultaneously over a period of 4 hours. The reaction vessel was heated to maintain the solvent reflux around 125 C during the feed. After the feed was over, 5.4 parts of methyl isobutyl ketone was used to rinse both feed tanks. Reaction temperature was then raised to distill methyl isobutyl ketone until resin solids reached 90%. The concentrated resin was then dropped in an aqueous solution of 24.6 parts of lactic acid, and 493.8 parts of water. The resulting solution had a nonvolatile content of 30%.

Example 4: Pigment Paste

A pigment grinding vehicle was prepared by charging 710 parts Epon®828 (diglycidyl ether of bisphenol A having an epoxide equivalent weight of 188) and 290 parts bisphenol A into a suitable vessel under nitrogen blanket and heated to 150-160° C. to initiate an exothermic reaction. The exothermic reaction was continued for about one hour at 150-160° C. The reaction mixture was then cooled to 120° C. and 496 parts of 2-ethylhexanol half capped toluene diisocyanate was added. The temperature of the reaction mixture was held at 110-120° C. for one hour. Then, 1095 parts of 2-butoxyethanol was added and the reaction mixture was then cooled to 85-90° C. Subsequently, 71 parts of deionized water was added followed by the addition of 496 parts quaternizing agent (prepared above). The temperature of the reaction mixture was held at 85-90° C. until an acid value of about 1 was obtained.

Formation of Pigment Paste

The materials below were mixed in suitable container until a homogeneous mixture formed. The mixture was dispersed by charging into an Eiger mill, the ground until a Hegman reading of greater than 7 was obtained.

| Ingredient | Parts by weight |
|---|---|
| Pigment grinding vehicle (described above) | 500 to 750 |
| Deionized Water | 1200 to 1600 |
| Surfactant | 10 to 30 |
| Dispersant | 10 to 30 |
| Aluminum silicate pigment | 800 to 1200 |
| Carbon black pigment | 5 to 20 |
| Titanium dioxide pigment | 700 to 1200 |

Formation of Catalyst Additive

The materials below were mixed in a suitable container for several hours. Wetting agent: Amine C or Surfynol 104

| Ingredient | Parts by weight |
|---|---|
| Water | 1200 to 1700 |
| Lactic acid | 600 to 1000 |
| Wetting agent | 0.4 to 5 |
| Bismuth oxide | 500 to 900 |
| Surfactant | 700 to 1200 |

Preparation of Electrocoat Bath

Each of the cathodic electrocoating baths set forth below were prepared by mixing one of the aforementioned emulsions with additives, followed by water and pigment paste, and then ultrafiltering the mixtures. Each bath was electrocoated at 170 to 280 volts to obtain 0.8-1.0 mils (20.23-25.4 microns). The baths were then compared for surface roughness and edge corrosion resistance after exposure of cyclic corrosion test VDA 233-102.

| | Parts by Weight | | |
|---|---|---|---|
| Description | Bath 1 | Bath 2 | Bath 3 |
| Emulsion 1 | 37.9 | — | — |
| Comparative Emulsion 1 | — | 44.1 | — |
| Comparative Emulsion 2 | — | — | 39.3 |
| Catalyst Additive | 1.3 | 1.3 | 1.3 |
| Flow Additive | 1.4 | 1.40 | 1.4 |
| Deionized water | 50.4 | 45.3 | 50.5 |
| Pigment Paste | 8.0 | 7.9 | 7.5 |
| Total | 100 | 100 | 100 |

The following examples are prepared and cured and evaluated to determine surface roughness as measured using ISO 4287® on pretreated electrogalvanized substrates and to determine edge protection as measured using VDA 233-102 at 6 cycles on perforated electrogalvanized substrates. These Examples are set forth in Table 3 below.

TABLE 3

| Emulsions In The Baths | Bath 1 Emulsion 1 | Bath 2 Comparative Emulsion 1 | Bath 3 Comparative Emulsion 2 |
|---|---|---|---|
| Voltage | 265 | 280 | 220 |
| Film build (μm) | 20.8 | 19.6 | 19.8 |
| Ra 6800OG (μm) | 0.31 | 0.26 | 0.42 |
| VDA 233-102 (6 weeks) | 2.8 | 5.0 | 4.7 |

The cathodic electrocoating bath comprising Emulsion 1 demonstrates improved edge protection without compromising coating appearance. The edge protection of the coating comprising the epoxy resin emulsion of this disclosure illustrates an improvement of two units by the VDA 233-102 (6 weeks) measurement, in comparison to the Comparative Emulsion 1 and Comparative Emulsion 2, while its coating appearance (Ra) is in the same range as the Comparative Example 1 and Comparative Example 2. The Emulsion 1 of these examples comprises a combination of catechol building block and dodecylphenol end-capping agent in epoxy resin emulsion compositions. The desirable edge protection improvement cannot be achieved if either of those two components is absent, for example, no catechol in Comparative Example 1 and no dodecylphenol in Comparative Example 2.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. An electrocoating composition comprising:
   A. an epoxy resin emulsion that is free of sulfamic acid and consists essentially of:
      (1) a continuous phase comprising water, lactic acid, methanesulfonic acid, and nitric acid; and
      (2) a dispersed phase comprising an epoxy resin that is reaction product of:
         (a) a liquid epoxy resin of diglycidyl ether of bisphenol A;
         (b) catechol;
         (c) dodecylphenol; and
         (d) polypropylene glycol; and
   B. a cross-linking resin that comprises the reaction product of methylene diphenyl diisocyanate and trimethylolpropane.

2. The electrocoating composition of claim 1 wherein said epoxy resin of said dispersed phase has a weight average molecular weight (Mw) of from about 1,000 to about 100,000 g/mol.

3. The electrocoating composition of claim 1 wherein said epoxy resin of said dispersed phase has a weight average molecular weight (Mw) of from about 5,000 to about 20,000 g/mol.

4. The electrocoating composition of claim 1 wherein said epoxy resin of said dispersed phase has a weight average molecular weight (Mw) of from about 5,000 to about 10,000 g/mol.

5. The electrocoating composition of claim 1 where-in epoxy resin emulsion consists essentially of said water, said acids, and said epoxy resin of said dispersed phase.

6. The electrocoating composition of claim 1 wherein
said water is present in an amount of about 53.5 wt %;
said lactic acid is present as a 56% solution in an amount of about 1.2 wt %;
said methane sulfonic acid is present as a 70% solution in an amount of about 0.7 wt %;
said liquid epoxy resin of diglycidyl ether of bisphenol A is utilized in an amount of about 15.1 wt %;
said catechol is utilized in an amount of about 2.7 wt %;
said dodecylphenol is utilized in an amount of about 0.8 wt %;
said polypropylene glycol has a weight average molecular weight of 900 g/mol and is utilized in an amount of about 3.7 wt %;
and
said cross-linking resin is present in an amount of about 18.3 wt %.

7. The electrocoating composition of claim 6 further comprising ethyltriphenyl phosphonium iodide, N,N-diethanolamine, aminopropyldiethanolamine, and a plasticizer additive.

8. The electrocoating composition of claim 7 wherein
said ethyltriphenyl phosphonium iodide is present in an amount of less than about 0.02 wt %;
said N,N-diethanolamine is present in an amount of about 1.7 wt %;
said aminopropyldiethanolamine is present in an amount of about 1 wt %; and
said plasticizer additive is present in an amount of about 0.8 wt %.

9. The electrocoating composition of claim 8 wherein the epoxy resin emulsion has a solids content of about 41.1%, and a particle size of about 105 nm.

10. The electrocoating composition of claim 9 wherein the epoxy resin of said dispersed phase has a weight average molecular weight of about 7566 g/mol.

11. The electrocoating composition of claim 7 wherein the epoxy resin emulsion has a solids content of about 41.1%, and a particle size of about 105 nm.

12. The electrocoating composition of claim 11 wherein the epoxy resin of said dispersed phase has a weight average molecular weight of about 7566 g/mol.

13. The electrocoating composition of claim 6 wherein the epoxy resin emulsion has a solids content of about 41.1%, and a particle size of about 105 nm.

14. The electrocoating composition of claim 13 wherein the epoxy resin of said dispersed phase has a weight average molecular weight of about 7566 g/mol.

15. The electrocoating composition of claim 1 further comprising ethyltriphenyl phosphonium iodide, N,N-diethanolamine, aminopropyldiethanolamine, and a plasticizer additive.

16. The electrocoating composition of claim 1 wherein the epoxy resin emulsion has a solids content of about 41.1%.

17. The electrocoating composition of claim 1 wherein the epoxy resin emulsion has a particle size of about 105 nm.

18. The electrocoating composition of claim 1 wherein the epoxy resin of said dispersed phase has a weight average molecular weight of about 7566 g/mol.

19. A coated substrate comprising:
an electrogalvanized substrate; and
a coating layer disposed on said electrogalvanized substrate, wherein the coating layer is formed from an electrocoating composition comprising:
A. an epoxy resin emulsion that is free of sulfamic acid and consists essentially of:
(1) a continuous phase comprising water, lactic acid, methanesulfonic acid, and nitric acid; and
(2) a dispersed phase comprising an epoxy resin that is reaction product of:
(a) a liquid epoxy resin of diglycidyl ether of bisphenol A;
(b) catechol;
(c) dodecylphenol; and
(d) polypropylene glycol; and
B. a cross-linking resin that comprises the reaction product of methylene diphenyl diisocyanate and trimethylolpropane,
wherein said epoxy resin that is the reaction product of (a)-(d) cures to form the coating layer, and
wherein the coating layer has a surface roughness Ra of less than 0.4 µm as measured using ISO 4287 (R) and that has an edge protection of less than 3 as measured using VDA 233-102 at 6 cycles.

20. The coated substrate of claim 19,
wherein, in the electrocoating composition,
said water is present in an amount of about 53.5 wt %;
said lactic acid is present as a 56% solution in an amount of about 1.2 wt %;
said methane sulfonic acid is present as a 70% solution in an amount of about 0.7 wt %;
said liquid epoxy resin of diglycidyl ether of bisphenol A is utilized in an amount of about 15.1 wt %;
said catechol is utilized in an amount of about 2.7 wt %;
said dodecylphenol is utilized in an amount of about 0.8 wt %;
said polypropylene glycol has a weight average molecular weight of 900 g/mol and is utilized in an amount of about 3.7 wt %; and
said cross-linking resin is present in an amount of about 18.3 wt %,
wherein the coating composition further comprises ethyltriphenyl phosphonium iodide, N,N-diethanolamine, aminopropyldiethanolamine, and a plasticizer additive, and
wherein
said ethyltriphenyl phosphonium iodide is present in an amount of less than about 0.02 wt %;
said N,N-diethanolamine is present in an amount of about 1.7 wt %;
said aminopropyldiethanolamine is present in an amount of about 1 wt %; and
said plasticizer additive is present in an amount of about 0.8 wt %.

* * * * *